United States Patent [19]

Yanagisawa et al.

[11] 3,891,873

[45] June 24, 1975

[54] PIEZOELECTRIC RESONATOR WITH MULTI LAYER ELECTRODES

[75] Inventors: Yuzuru Yanagisawa, Fujisawa; Hidemasa Tamura, Yokohama, both of Japan

[73] Assignee: Sony Corporation, Tokyo, Japan

[22] Filed: Nov. 30, 1973

[21] Appl. No.: 420,465

[30] Foreign Application Priority Data

| | | |
|---|---|---|
| Dec. 9, 1972 | Japan | 47-123653 |
| Oct. 6, 1973 | Japan | 48-112726 |

[52] U.S. Cl. .......... 310/9.7

[51] Int. Cl. .......... H04r 17/00

[58] Field of Search .......... 310/9.7, 9.8, 8; 333/30 R

[56] References Cited

UNITED STATES PATENTS 3,481,014 2/1969 Noren .......... 310/9.7 X

*Primary Examiner*—Mark O. Budd

*Attorney, Agent, or Firm*—Hill, Gross, Simpson, Van Santen, Steadman, Chiara & Simpson

[57] ABSTRACT

A resonator comprising a single crystal plate of lithium tantalate, lithium niobate or the like is provided having electrodes formed on the plate, the electrodes being multiple layers including gold, chromium, copper and chromium. A novel method of forming such a resonator is also disclosed.

6 Claims, 12 Drawing Figures

PIEZOELECTRIC RESONATOR WITH MULTI LAYER ELECTRODES

BACKGROUND OF THE INVENTION

1. Field of the Invention

This invention relates generally to a resonator consisting of a piezoelectric crystalline material including lithium or the like and a method of making the same, and to a solution of the problem of providing effective and efficient electrodes for a plate formed of such a piezoelectric material and a method of making the same.

2. Description of the Prior Art

In the prior art, resonators have been employed formed of quartz because of the small temperature-frequency coefficient of quartz. However, the electromechanical coupling coefficient of quartz is small, for example, 0.002, and hence it is not suited as a resonator of wide frequency deviation such, for example, as an FM modulator.

The problem has also existed that since the resonant frequency band of quartz is narrow, quartz is not suitable for use in a wide bandpass filter.

In the U.S. Pat. No. 3,525,885, issued on Aug. 25, 1970, "Low Temperature-Frequency Coefficient Lithium Tantalate Cuts And Devices Utilizing Same", there is disclosed an X-cut plate of lithium tantalate ($LiTaO_3$). A piezoelectric crystalline material including lithium such as lithium tantalate or lithium niobate (LiNbO) is very good in its electromechanical coupling coefficient, for example, 0.6 and in that it has a substantially zero temperature-frequency coefficient. For this reason, such a material is preferred as a material for a resonator of FM modulator for a wide bandpass filter or the like. However, a resonator made of such a material requires integral electrodes as described in the above U.S. patent. As a material for the integral electrodes there has been suggested aluminum, gold or the like, but aluminum is weak in adhesive force, and easily oxidized and changed in characteristics as time has lapsed, while noble metal such as gold presents a problem in adhesive force when used as the integral electrodes.

In general, the thermal expansion coefficient of suitable piezoelectric crystalline material including lithium is very small as compared with that of metal. Accordingly, if electrodes are formed on the piezoelectric crystalline material by vapor deposition, due to the thermal expansion of a metal mask used therein the formed electrodes are obscure along their edges and/or deviate in position, thus deteriorating the characteristics thereof as a resonator.

SUMMARY OF THE INVENTION

An object of this invention is to provide a novel resonator which is less changed in its resonant frequency with time lapse than heretofore known, and a method of making the same.

Another object of the invention is to provide a novel method of making a resonator with electrodes of a desired pattern.

A further object of the invention is to provide an improved method of making resonators with uniform resonant characteristics.

A still further feature of the present invention is to provide a novel resonator formed of a piezoelectric material such as lithium tantalate, lithium niobate or other piezoelectric material containing lithium, and having electrodes formed of multiple layers of vapor deposited or sputted metals, the inner layer being chromium and the outer layer gold.

The other objects, features and advantages of the invention will become apparent from the following description taken in conjunction with the accompanying drawings.

In the following description, the term a piezoelectric plate means that already subjected to poling.

DESCRIPTION OF THE PREFERRED EMBODIMENTS

Figures 1, 2, 3, 4, 5, 6:
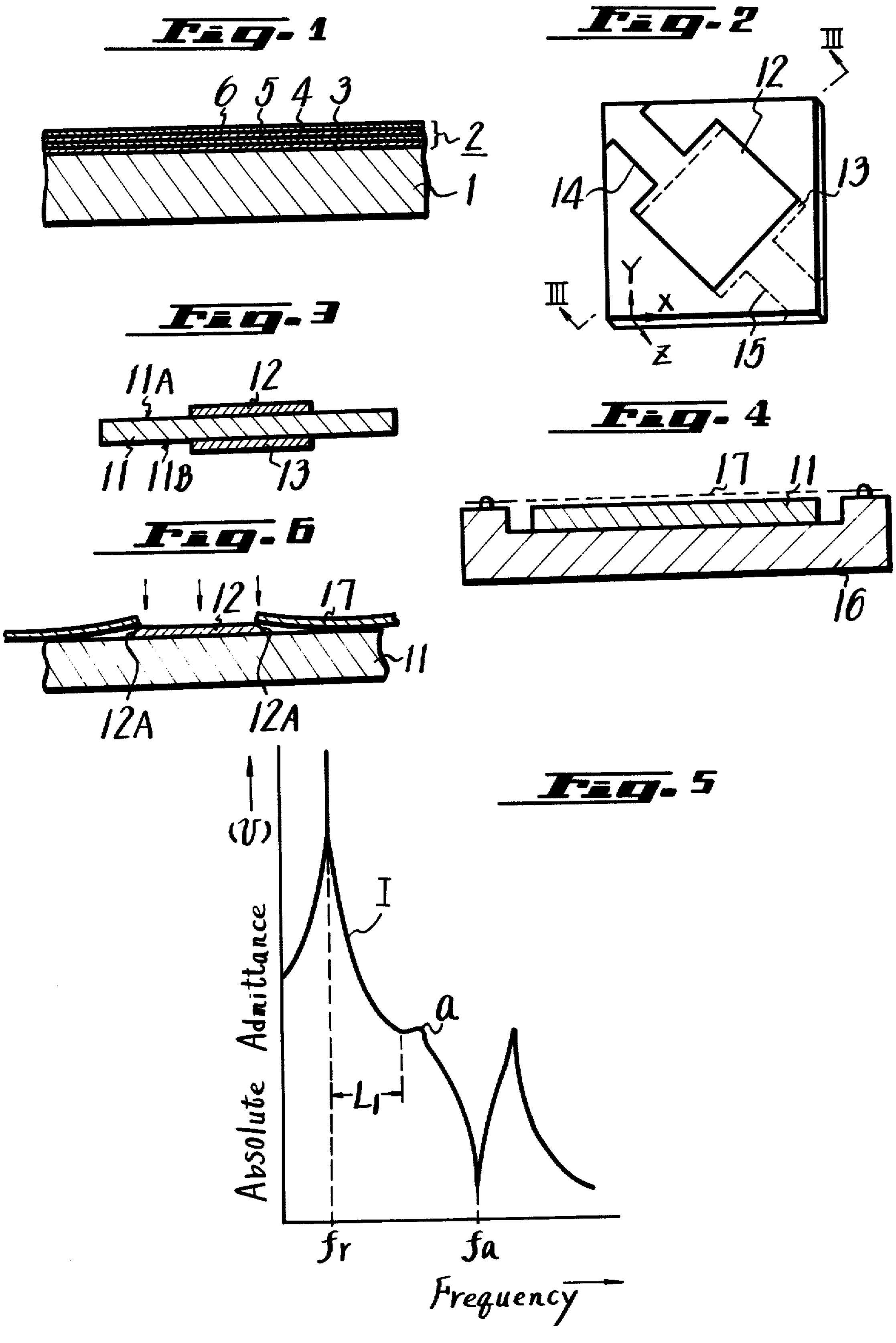
FIG. 1 is a cross-sectional view showing the electrode structure of an example of the resonator according to this invention.
FIG. 2 is an isometric view showing an example of the resonator according to the invention.
FIG. 3 is a cross-sectional view taken on the line III—III in FIG. 2.
FIG. 4 is a schematic cross-sectional view of a vapor deposition device used in the invention.
FIG. 5 is a graph illustrating the resonant characteristics of the resonator of the invention.
FIGS. 6 and 7 are fragmentary cross-sectional views illustrating the conditions of electrodes formed by vapor depositions, respectively.

FIG. 1 shows a portion of a resonator and an electrode structure therefor according to this invention. In this embodiment, a piezoelectric plate 1 includes lithium tantalate, lithium niobate or the like and an electrode 2 is formed on this piezoelectric plate 1. The electrode 2 consists of an under layer 3 formed of a metal having an incomplete 3d shell such as chromium, titanium or the like or a socalled transition metal, a copper layer 4, a chromium layer 5 and a gold layer 6. The respective layers 3, 4, 5 and 6 are formed by vapor deposition or sputtering of chromium Cr, copper Cu, chromium Cr and gold Au in thickness of, for example, 500 Angstroms, 8000 Angstroms, 500 Angstroms and 4000 Angstroms on the piezoelectric plate 1 which is desirably heated at a temperature of from 200° to 300°C, preferably from 250° to 300°C. In this case, the under layer 3 is well bonded to the piezoelectric plate 1, from a mechanical standpoint, due to the fact that the transition metal in the under layer 3 is diffused into the piezoelectric plate 1 while the titanium in the piezoelectric plate 1 is diffused into the under layer 3.

As an electrode for the resonator, only the under layer 3 is theoretically sufficient, but the copper layer 4 is necessary to obtain sufficient electric conductivity. A noble metal such as gold or the like may be employed instead of the layer 4, but a noble metal may damp the vibration of the piezoelectric plate 1 due to its great specific gravity. Therefore, copper which is lighter in specific gravity and superior in electric conductivity than the gold, is preferred as the layer 4.

The gold layer 6 is formed to prevent oxidation. Accordingly, a gold layer 6 might be formed directly on the copper layer 4, but gold and copper are easily molten at temperatures of 300° to 400°C to deteriorate resistance for weather. Accordingly, a chromium layer 5, which is superior in affinity to both the gold and copper, is better to use between the copper layer 4 and the gold layer 6. The chromium layer 5 may be one formed of transition metal of titanium Ti, as is also the case of the under layer 3, and the gold layer 6 may be replaced with another layer of noble metal such as silver.

When the variation of the characteristics of the resonator thus formed is ascertained by a high temperature acceleration test of 85°C, the variation of oscillation frequency thereof is about ±3 ppm of its initial value after 500 hours have lapsed.

When a resonator consisting of a piezoelectric plate 1 including lithium Li and having an electrode made of aluminum Al is tested under the same condition, the variation of oscillation frequency thereof exceeds 100 ppm after about 100 hours have lapsed. In this case, since the adhesive property of the aluminum electrode to the piezoelectric plate 1 is low, it is almost impossible for an external lead to be led out therefrom. For example, when an aluminum electrode of 1.2 mm square is formed on the resonator and is connected with one end of a brass wire of 1 mm in diameter by an adhesive agent and the brass wire is pulled, the aluminum electrode is torn off from the piezoelectric plate 1 at a force of 115 to 345 gr. When a similar test is carried out for a resonator with a chromium electrode, the piezoelectric plate is broken at a force of 1200 gr., but the adhesion between the piezoelectric plate and the chromium electrode is not damaged at all.

It is preferred that the thickness of the chromium layer be 50 Angstroms minimum, from the view point of mechanical strength, but 1 micron in maximum. If the thickness is greater than 1 micron, it has a bad influence on the oscillation of the resonator to deteriorate the Q factor of the resonator.

The thickness of the copper layer 4, the chromium layer 5 and the gold layer 6 must be, as a minimum, 100 Angstroms.

FIGS. 2 and 3 show an embodiment of the resonator for the thickness-shear mode according to the invention. In this embodiment, a piezoelectric plate 11 has formed on both its surfaces 11A and 11B electrodes 12 and 13 in opposed relation with each other. The electrodes 12 and 13 have lead portions 14 and 15, respectively, and are electrically connected to external electric circuits through these lead portions 14 and 15. Though not shown, the electrodes 12 and 13 consist of multiple metal layers formed of Cr-Cu-Cr-Au by vapor deposition as shown in FIG. 1. In FIG. 2, reference letters X, Y, and Z show axes of the piezoelectric single crystal forming the piezoelectric plate 11.

By way of example, the actual size of a resonator is that designed for a resonance frequency of 10 MHz, is a piezoelectric plate of 200 microns in thickness and 4×4 mm in area and its electrodes are 1.5×1.5 mm in area.

With reference to FIG. 4, a device for making the electrodes 12 and 13 shown in FIGS. 2 and 3 will now be described. The piezoelectric plate 11 is placed on a base member 16. A metal mask 17 with windows corresponding to the plurality of electrode patterns is disposed in opposed relation to the piezoelectric plate 11 and the electrodes 12 and 13 are formed on the piezoelectric plate 11 through the metal mask 17 by vapor deposition. Thus formed piezoelectric plate 11 is cut into pieces to form the resonators shown in FIG. 2. The metal mask 17 is formed of a thin plate of copper, stainless steel or the like.

When the resonant characteristics of resonators of 25 MHz, which have the multiple metal layers formed by vapor deposition, are measured, a number of the resonators have the resonant characteristics shown by a curve I in FIG. 5, in which the ordinate represents an absolute admittance and the abscissa a frequency.

As apparent from FIG. 5, it is noted that there occurs an undesired sub-resonance *a* between a resonant frequency $f_a$ and an anti-resonant frequency $f_r$, thus limiting the practical operating range to $L_1$.

From various experiments, it has been determined that the sub-resonance *a* is caused by the fact that a reverse symmetry based upon an asymmetry of the electrodes 12 and 13 due to the position-shift or obscure contour of the electrodes, or vibration of the piezoelectric plate 11 other than its longitudinal vibration in its thickness direction is excited.

One of the reasons is that the metal mask 17 is distorted due to its thermal expansion, as shown by FIG. 6, during heating process for vapor deposition and hence the peripheral portion 12A of the electrode 12 becomes obscure.

Figure 7:
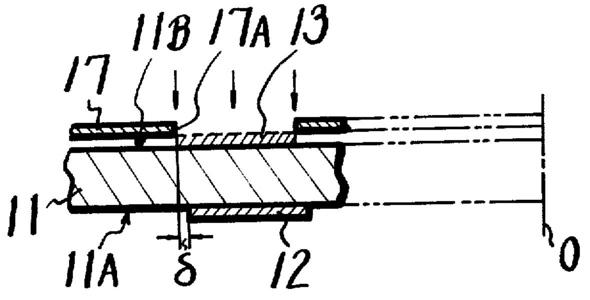

It may be considered that another one of the reasons is that the distance between a peripheral window 17A of the mask 17 and its center O is varied by the thermal expansion of the metal mask 17 and consequently there is produced a displacement between the electrodes 12 and 13 when the electrode 12 is formed on the surface 11A of the piezoelectric plate 11 and thereafter the electrode 13 is formed on the other surface 11B of the piezoelecric plate 11 by turning over the plate 11 as shown in FIG. 7.

Figure 8:
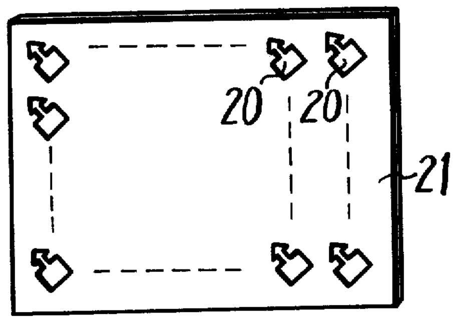
FIG. 8 is an isometric view of a metal mask used in the invention.

According to the invention, in order to avoid such defects, a mask 21 which has provided therethrough a number of windows 20 with the same shape and pattern as those of electrodes to be deposited, as shown in FIG. 8, is formed of a thin plate (of about 50 microns in thickness) made of material with a low thermal expansion coefficient, such as invar. Invar is a kind of nickel-steel which consists of smaller than 0.20% of C., 0.5% of Mn, 36% of Ni and residual part of Fe. The invar has the line expansion coefficient of $1\times10^{-6}$/deg. which approximates that of $LiTaO_3$ or $LiNbO_3$ which is also a piezoelectric material. The thermal expansion coefficient of $LiTaO_3$ is about $16.1\times10^{-6}$/deg. in its X and Y axis directions and $1.2\times10^{-6}$/deg. in its Z axis direction, while the thermal expansion coefficient of $LiNbO_3$ is $15.4\times10^{-6}$/deg. in its X and Y axis directions and $7.5\times10^{-6}$/deg. in its Z axis direction.

A super invar made by adding a small amount of Mn to the above invar which has a line expansion coefficient of $1\times10^{-7}$/deg. can be used, and further a non-magnetic invar consisting of 90 to 95% of Cr, 5% of Fe and smaller than 1% of Mn also can be used.

Figure 9:
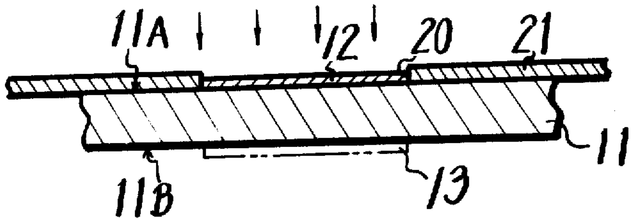
FIG. 9 is a cross-sectional view showing the condition of electrodes formed by vapor deposition.

The thus formed mask 21 is disposed on one surface 11A of the piezoelectric plate 11 made of $LiTaO_3$ or $LiNbO_3$ as shown in FIG. 9 and then Cr, Cu, Cr and Au are applied through the windows 20 of the mask 21 to the plate 11 in this order by vapor deposition to form the electrode 12. Thereafter, the piezoelectric plate 11 is turned over and the same electrode vapor deposition process is applied to the other surface 11B of the piezoelectric plate 11 through the same metal mask 21 to form the other electrode 13.

Figure 10:
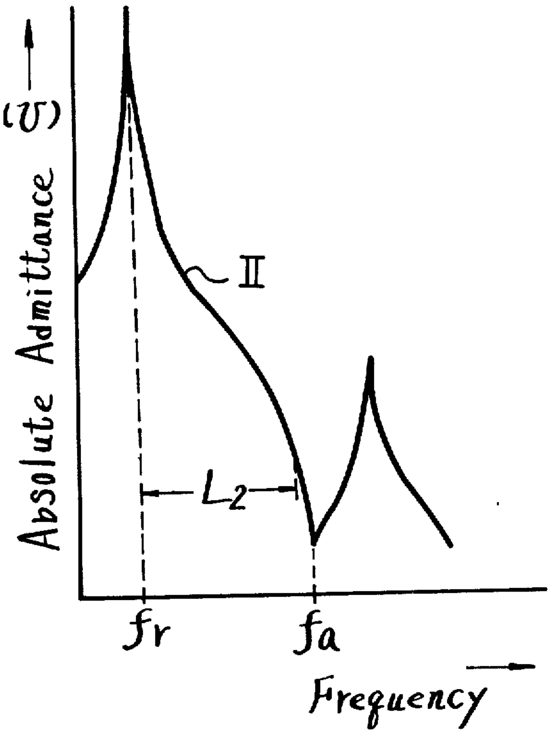
FIG. 10 is a graph illustrating an example of the resonant characteristics of the resonator according to the invention.

It has been determined that thus obtained resonator has the resonant characteristics shown in FIG. 10 by a curve II which has no unnecessary sub-resonance and a wide effective range $L_2$. Further, it is also noted that the scatter of the resonant capacity of the resonator necessary for circuit application is reduced to be 1/10 as compared with that of the prior art and the scatter of frequency thereof is also reduced, which is suitable for mass production. The reason is that the metal mask 21 is made of invar to be thin and less distorted, and which is prevented from being distorted by thermal expansion, and consequently the electrodes 12 and 13 can be formed with accurate symmetry.

Figure 11:
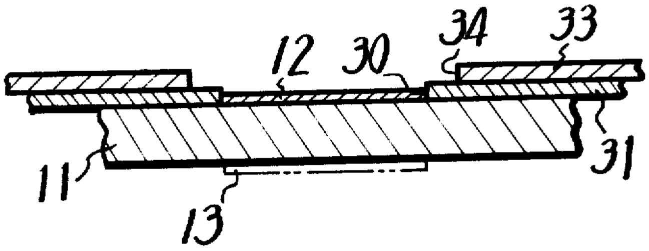
FIG. 11 is a fragmentary cross-sectional view showing the condition of an electrode formed by vapor deposition.
Figure 12:
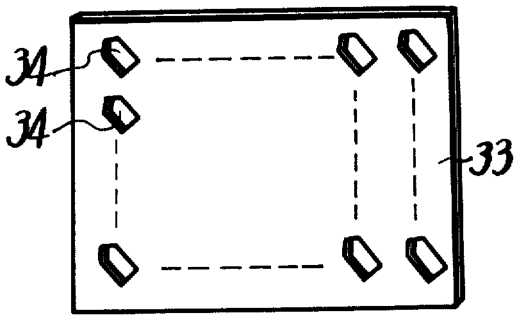
FIG. 12 is an isometric view showing a hold plate used in the invention.

With reference to FIGS. 11 and 12, another vapor deposition method according to this invention will now be described. In this example, a metal mask 31 is formed of an ordinary metal consisting of iron, nickel, stainless steel or the like. The thus formed metal mask 31 is disposed on the piezoelectric plate 11 and then a relatively thick hold plate 33 made of invar mentioned as above is placed on the metal mask 31. In this case, the hold plate 33 has formed therethrough a window 34 which is positioned in correspondence with a window 30 of the metal mask 31 and has dimensions slightly greater than that of the window 30, as shown in FIG. 12. Thereafter, the similar vapor deposition is applied to the piezoelectric plate 11 on its both surfaces 11A and 11B to for the electrodes 12 and 13, respectively.

With this method, even if the metal mask 31 is subjected to thermal expansion and hence distortion is formed upon vapor deposition, such a distortion is suppressed by the invar hold plate 33. Thus, the electrodes 12 and 13 are formed with a high degree of symmetry. As a result, a resonator with no sub-resonance and resonant characteristics shown by the curve II in FIG. 10, as in the case of FIG. 9, can be obtained.

It is also possible that the metal mask 31 be made of a thin invar plate, the hold plate 33 be made of a thick invar plate and are combined in the same manner.

In the above examples, the electrode is formed by vapor deposition, but it may be possible that chromium is vapor-deposited and thereafter copper, chromium and gold are coated thereon in this order by electroplating.

Further, it may be also possible that the under layer is formed of a chromium layer by vapor deposition and of a chromium layer by electro-plating.

It may be apparent that many variations and modifications could be effected by those skilled in the art without departing from the spirit and scope of the novel concepts of the present invention, and hence the scope of the invention should be determined by the appended claims.

We claim as our invention:

1. A resonator comprising a plate of piezoelectric material containing lithium, electrodes formed on opposite sides of said plate and each electrode comprising a first layer of chromium adjacent said piezoelectric plate, a second layer of copper formed over said first layer, a third layer of chromium formed over said second layer, and a fourth outer layer of a noble metal formed over said third layer.

2. A resonator according to claim 1 in which the outer layer of each of said electrodes is silver.

3. A resonator according to claim 1, in which said piezoelectric material is lithium tantalate.

4. A resonator according to claim 1, in which said piezoelectric material is lithium niobate.

5. A resonator according to claim 1, in which the outer layer of each said electrodes is gold.

6. A resonator comprising a plate of piezoelectric material containing lithium, electrodes formed on opposite sides of said plate and each electrode comprising a first layer of titanium adjacent said piezoelectric plate, a second layer of copper formed over said first layer, a third layer of titanium formed over said second layer, and a fourth outer layer of a noble metal formed over said third layer.

* * * * *